(12) United States Patent
Hurd et al.

(10) Patent No.: US 11,781,638 B2
(45) Date of Patent: Oct. 10, 2023

(54) AXLE ASSEMBLY

(71) Applicant: J. C. Bamford Excavators Limited, Uttoxeter (GB)

(72) Inventors: Thomas Deckland Hurd, Uttoxeter (GB); John Gwynfor Lloyd, Uttoxeter (GB); Jonathan Francis Nelson, Uttoxeter (GB); Patrick Caffrey, Uttoxeter (GB); Gareth Trimmer, Uttoxeter (GB)

(73) Assignee: J. C. Bamford Excavators Limited, Uttoxeter (GB)

( * ) Notice: Subject to any disclaimer, the term of this patent is extended or adjusted under 35 U.S.C. 154(b) by 0 days.

(21) Appl. No.: 17/719,329

(22) Filed: Apr. 12, 2022

(65) Prior Publication Data

US 2022/0324256 A1 Oct. 13, 2022

(30) Foreign Application Priority Data

Apr. 12, 2021 (GB) .................................. 2105204

(51) Int. Cl.
*F16H 57/04* (2010.01)
*B60B 35/16* (2006.01)
(Continued)

(52) U.S. Cl.
CPC ......... *F16H 57/0423* (2013.01); *B60B 35/16* (2013.01); *F16H 57/0421* (2013.01);
(Continued)

(58) Field of Classification Search
CPC .... F16H 57/04; F16H 57/042; F16H 57/0421; F16H 57/0423; F16H 57/0457;
(Continued)

(56) References Cited

U.S. PATENT DOCUMENTS 924,782 A * 6/1909 Hoppe ................. B29D 23/001
138/132
1,560,391 A * 11/1925 Lobdell ............... F16H 57/0483
184/6
(Continued)

FOREIGN PATENT DOCUMENTS

DE 1625891 B1 * 6/1974
DE 3116595 C2 * 6/1990
(Continued)

OTHER PUBLICATIONS https://web.archive.org/web/20160618132755/https://www.acehose.com/rubber-tubing.htm; site has published date of Jun. 18, 2016 (Year: 2016).*

(Continued)

*Primary Examiner* — Adam D Rogers
(74) *Attorney, Agent, or Firm* — MARSHALL, GERSTEIN & BORUN LLP

(57) ABSTRACT

An axle assembly for a working machine is provided. The axle assembly has an axle housing comprising a central portion housing a gear, wherein the gear is configured to rotate about an axis and is configured to be partially disposed in a lubricant reservoir, and at least one arm portion extending from the central portion, with the arm portion housing at least one driveshaft. The axle assembly further includes a conduit assembly configured to direct lubricant from the central portion to the arm portion, with the conduit assembly including a lubricant catcher having an inlet disposed in an interior volume of the central portion.

13 Claims, 5 Drawing Sheets

(51) Int. Cl.
*F16D 65/12* (2006.01)
*F16D 65/02* (2006.01)
*F16H 57/02* (2012.01)

(52) U.S. Cl.
CPC ..... *F16H 57/0457* (2013.01); *F16H 57/0483* (2013.01); *B60B 2900/561* (2013.01); *F16D 65/128* (2013.01); *F16D 2065/1328* (2013.01); *F16H 2057/02052* (2013.01)

(58) Field of Classification Search
CPC ....... F16H 57/0483; F16H 2057/02052; B60B 35/16; B60B 2900/561; F16D 65/128; F16D 2065/1328; F16N 7/26; F16N 31/02; F16L 11/14; F16L 11/1185
See application file for complete search history.

(56) References Cited

U.S. PATENT DOCUMENTS

| | | | | |
|---|---|---|---|---|
| 3,470,767 | A * | 10/1969 | Gray | F16H 57/0483 417/279 |
| 4,113,067 | A * | 9/1978 | Coons | F16D 65/853 188/71.6 |
| 4,630,711 | A * | 12/1986 | Levrai | F16N 7/28 184/6.12 |
| 5,316,106 | A | 5/1994 | Baedke et al. | |
| 6,499,565 | B1 * | 12/2002 | Coyle | F16H 57/0412 184/6.12 |
| 6,997,284 | B1 | 2/2006 | Nahrwold | |
| 7,178,426 | B2 * | 2/2007 | Turner | F16H 57/0447 184/11.1 |
| 8,714,310 | B2 * | 5/2014 | Bares | F16D 65/78 184/26 |
| 9,151,377 | B2 * | 10/2015 | Weber | F16H 57/0409 |
| 10,190,673 | B2 * | 1/2019 | Creech | F16H 57/0435 |
| 10,837,544 | B2 * | 11/2020 | Dewa | F16H 57/0424 |
| 11,313,453 | B2 * | 4/2022 | Bidner | F16H 57/0427 |
| 11,421,773 | B1 * | 8/2022 | Potdar | F16H 57/0423 |
| 2014/0013886 | A1 | 1/2014 | Weber et al. | |
| 2014/0265541 | A1 | 9/2014 | Dockstader et al. | |
| 2020/0016931 | A1 | 1/2020 | Balistreri | |
| 2021/0001704 | A1 * | 1/2021 | Eschenbeck | F16J 15/062 |
| 2022/0042591 | A1 * | 2/2022 | Yu | F16C 33/6659 |

FOREIGN PATENT DOCUMENTS

| | | | |
|---|---|---|---|
| DE | 40 23 354 A1 | 1/1992 | |
| FR | 2744508 A1 * | 8/1997 | ........ F16H 57/0447 |
| GB | 2506509 A * | 4/2014 | ........ F16H 57/0404 |
| WO | WO-2019/169223 A1 | 9/2019 | |

OTHER PUBLICATIONS

Search Report for GB 2105204.8, dated Oct. 12, 2021.
Extended European Search Report issued in EP 22167730.5, dated Oct. 21, 2022.

* cited by examiner

AXLE ASSEMBLY

FIELD

The present disclosure relates to an axle assembly for a working machine and a working machine comprising said axle assembly.

BACKGROUND

Vehicles, in particular working machines, can include an axle assembly containing a wet brake and/or gear systems (e.g. differential gearing systems) that run in a bath of lubricant e.g. oil. Braking energy and parasitic losses from the gear systems can be converted into heat, which is conducted into the oil. In some cases, air flow across the axle assembly casings cools the casings, and subsequently cools the oil to acceptable levels.

However, in some cases, air flow across the axle assembly casings is not sufficient to cool the oil to temperatures within acceptable limits. This is sometimes the case during higher speed operation and braking events.

It is known to use thermostatic valves and heat exchangers to achieve oil cooling, for example from U.S. Pat. No. 6,997,284. However, this arrangement is costly and complex. In the off-highway environment, damage to a heat exchanger would be highly likely. Furthermore, a heat-exchanger would likely become clogged with mud/sand/aggregate etc. and therefore would cease to function effectively. The use of a thermostatic valve introduces another potential point of failure in this system.

The present disclosure seeks to overcome or at least mitigate the problems of the prior art.

SUMMARY

In accordance with a first aspect, an axle assembly for a working machine is provided, the axle assembly having an axle housing comprising:

a central portion housing a gear, wherein the gear is configured to rotate about an axis and is configured to be partially disposed in a lubricant reservoir, and at least one arm portion extending from the central portion, the arm portion housing at least one driveshaft, the axle assembly further comprising a conduit assembly configured to direct lubricant from the central portion to the arm portion, the conduit assembly comprising a lubricant catcher having an inlet disposed in an interior volume of the central portion.

In use, lubricant from the lubricant reservoir is propelled by the gear within an internal volume of the central portion. The lubricant catcher intercepts the trajectory of the propelled lubricant such that the lubricant enters the inlet of the catcher, travels along the flow path and is directed to the arm portion via the conduit assembly.

Since the arm portion runs cooler than the central portion, due to better exposure to air flow and also the absence of loss inducing rotating parts, this has the effect of cooling the lubricant. In this way, the surface area of the axle housing can be used more effectively to improve temperature uniformity across the axle assembly, leading to lower operating lubricant temperatures in the central portion, which improves lubricant life. No heat-exchanger, valves or similar components are required, which results in an axle assembly which is simple and is more suitable for off-highway conditions.

Since the lubricant is propelled by the gear (e.g. a crown gear), a traditional pump is not required. Rather the action of the rotating gear is sufficient to move lubricant out of the central portion. In this way, a simple way of cycling lubricant round the axle assembly is provided.

Further, by placing the inlet of the lubricant catcher in the interior volume of the central portion, the catcher is placed directly into the splash of lubricant from the gear and so the amount of lubricant entering the catcher is maximized.

Axle assemblies disclosed herein are particularly useful in high speed axles that have lubricant immersed wet brakes located in close proximity to a central differential gearing system.

In some embodiments, the central portion may be located approximately in the center of the axle assembly. In some embodiments, the central portion may be at any location along the axle assembly, e.g. not at the center but offset to one side or another. In some embodiments, the central portion can be thought of as a gear housing portion.

Optionally the conduit assembly defines a flow path extending from the inlet of the lubricant catcher in a direction transverse to the axis of rotation of the gear.

In this way, the flow path is more closely aligned to the trajectory of the lubricant leaving the gear. Accordingly, the trajectory of the lubricant is maintained as much as possible, rather than having to change direction and hitting against a wall of the conduit assembly. Accordingly, loss of flow is minimized.

Optionally the conduit assembly defines a flow path extending from the inlet of the lubricant catcher to an exterior of the axle housing, in a direction transverse to the axis of rotation of the gear.

By extending the load path to an exterior of the axle housing, greater cooling can be achieved owing to better exposure to airflow.

Optionally, in use, the gear is configured to move lubricant out of said lubricant reservoir, and the inlet of the lubricant catcher is positioned in alignment with a trajectory of movement of said lubricant, such that lubricant can enter the inlet.

In this way, the amount of lubricant entering the catcher can be maximized.

Optionally the inlet is open in a direction opposite to a direction of rotation of the gear.

In other words, the inlet faces the direction of rotation of the gear, e.g. the inlet is positioned in line with the trajectory of the lubricant. This maximizes the amount of lubricant directed out of the central portion by the lubricant catcher.

Optionally the lubricant catcher is configured such that it can only be fitted in a single orientation with respect the central portion of the axle housing.

In other words, the lubricant catcher can only be fitted in one position/orientation with respect to the axle housing. This ensures that the inlet and/or flow path of the lubricant catcher are optimally aligned with the trajectory of the lubricant in the central portion, thereby optimizing flow out of the central portion. In exemplary embodiments, the single orientation of the lubricant catcher can be achieved by the use of offset fixing bolts or other suitable means.

In some embodiments, the lubricant catcher is configured such that it can be fitted in a plurality of predetermined orientations with respect to the central portion of the axle housing. In some embodiments, the lubricant catcher is configured such that it can be fitted to the central portion in any orientation.

Optionally the lubricant catcher is located at a rear side of the central portion with respect to an intended direction of motion of the axle assembly when fitted to a machine.

In this way, the axle assembly may better fit the configuration of a working machine.

In some embodiments, the lubricant catcher is located at any point along a perimeter (e.g. a circumference) of the central portion of the axle housing.

Optionally the conduit assembly comprises a bore diameter of at least 5 mm, for example, at least 7 mm, for example at least 10 mm, for example at least 14 mm, e.g. 14 mm.

In this way, flow through the conduit assembly is maximized.

Optionally the conduit assembly comprises at least one conduit external to the axle housing, said conduit being configured to direct lubricant from the central portion to the arm portion.

In this way, improved cooling of the lubricant is achieved due to better exposure to airflow outside the axle housing.

Optionally the lubricant catcher extends through a wall of the central portion of the axle housing and is coupled to said conduit.

In this way, the lubricant is quickly directed to an exterior of the axle housing, which maximizes cooling.

Optionally the lubricant catcher and conduit are integrally formed, or wherein the lubricant catcher and conduit are separate components.

Where the catcher and conduit are separate components, the catcher can be more easily fitted, replaced and/or maintained, without requiring dismantling of the axle assembly.

Optionally the lubricant catcher and/or conduit has a bore diameter of at least 10 mm, e.g. at least 14 mm.

Optionally the lubricant catcher and/or conduit has a substantially constant bore diameter.

In this way, restrictions on flow of lubricant through the conduit assembly are minimized and the flow of lubricant from the central portion is maximized.

In some embodiments, the lubricant catcher and/or conduit comprises a non-constant bore diameter.

Optionally the arm portion is a first arm portion and the conduit is a first conduit, wherein the axle assembly further comprises a second arm portion and the conduit assembly comprises a second conduit, wherein the second conduit is configured to direct lubricant from the central portion to the second arm portion.

By having two conduits, this takes advantage of the greater surface area of the housing of two arm portions (i.e. a greater surface area) for cooling the lubricant.

Optionally the or each conduit is made of a conductive material e.g. steel.

In this way, additional heat sink capability is provided. In some cases, improved durability will be provided.

In some embodiments, the or each conduit is made of any suitable material, e.g. a non-conductive material.

In some embodiments, the lubricant catcher is made of a conductive material e.g. steel. In other embodiments, any suitable material may be used e.g. a non-conductive material.

Optionally the central portion and the or each arm portion define a shared lubricant reservoir, such that lubricant directed to the or each arm portion by the conduit assembly can return to the central portion under gravity.

This provides a simple system for cycling lubricant from the central portion, out to the or each arm portion, and back to the central portion, without the need for any valves, pumps, or other complex parts that increase complexity, cost and also increase the number of components that could fail.

Optionally the axle assembly further comprises a wet brake system comprising one or more plates, wherein each of the one or more plates comprises an aperture configured to permit flow of lubricant therethrough.

By providing apertures in the one or more plates, a simple means for enabling lubricant to return to the central portion is provided.

In some embodiments, the axle assembly does not include any brakes. In some embodiments, external disc brakes are provided external to the axle housing.

Optionally the conduit assembly is configured to direct lubricant from the central portion to a distal end of the or each arm portion.

In some embodiments the central portion and the or each arm portion are integrally formed. In some embodiments the central portion and the or each arm portion are separate components.

In accordance with a second aspect, an axle assembly for a working machine is provided, the axle assembly having an axle housing comprising:

a central portion housing a gear which is configured to rotate about an axis and which is partially disposed in a lubricant reservoir, and at least one arm portion extending from the central portion, the arm portion housing at least one driveshaft, the axle assembly further comprising a conduit assembly configured to direct lubricant from the central portion to the arm portion, wherein an interior volume of the arm portion is in fluid communication with an interior volume of the central portion such that lubricant directed to the arm portion can return to the central portion under gravity.

In this way, a simple means for cycling oil from the central portion, out to the arm portion and back to the central portion is provided. There is no requirement for a pump, valve and/or other complex component in order to achieve cycling and hence cooling of the lubricant. This reduces costs and complexity, and also is more suitable for the off-highway environment in which complex mechanisms may be more prone to damage.

Optionally the central portion and the arm portion define a shared lubricant reservoir, such that lubricant directed to the arm portion by the conduit assembly returns to the central portion under gravity.

Optionally the axle assembly further comprises a wet brake system comprising one or more plates, wherein each of the one or more plates comprises an aperture configured to permit flow of lubricant therethrough.

In some embodiments, the axle assembly does not include any brakes. In some embodiments, external disc brakes are provided external to the axle housing.

Optionally the axle assembly does not comprise a pump and/or valve for directing the flow of lubricant.

In some embodiments the central portion and the or each arm portion are integrally formed. In some embodiments the central portion and the or each arm portion are separate components.

In accordance with a third aspect, a working machine is provided comprising an axle assembly as disclosed herein.

It will be appreciated that the features disclosed herein may be combined with any of the aspects provided above. All possible combinations are not explicitly provided for the sake of brevity.

BRIEF DESCRIPTION OF THE DRAWINGS

Embodiments disclosed herein will now be described, by way of example only, with reference to the accompanying drawings, in which.

DETAILED DESCRIPTION

Figure 1:
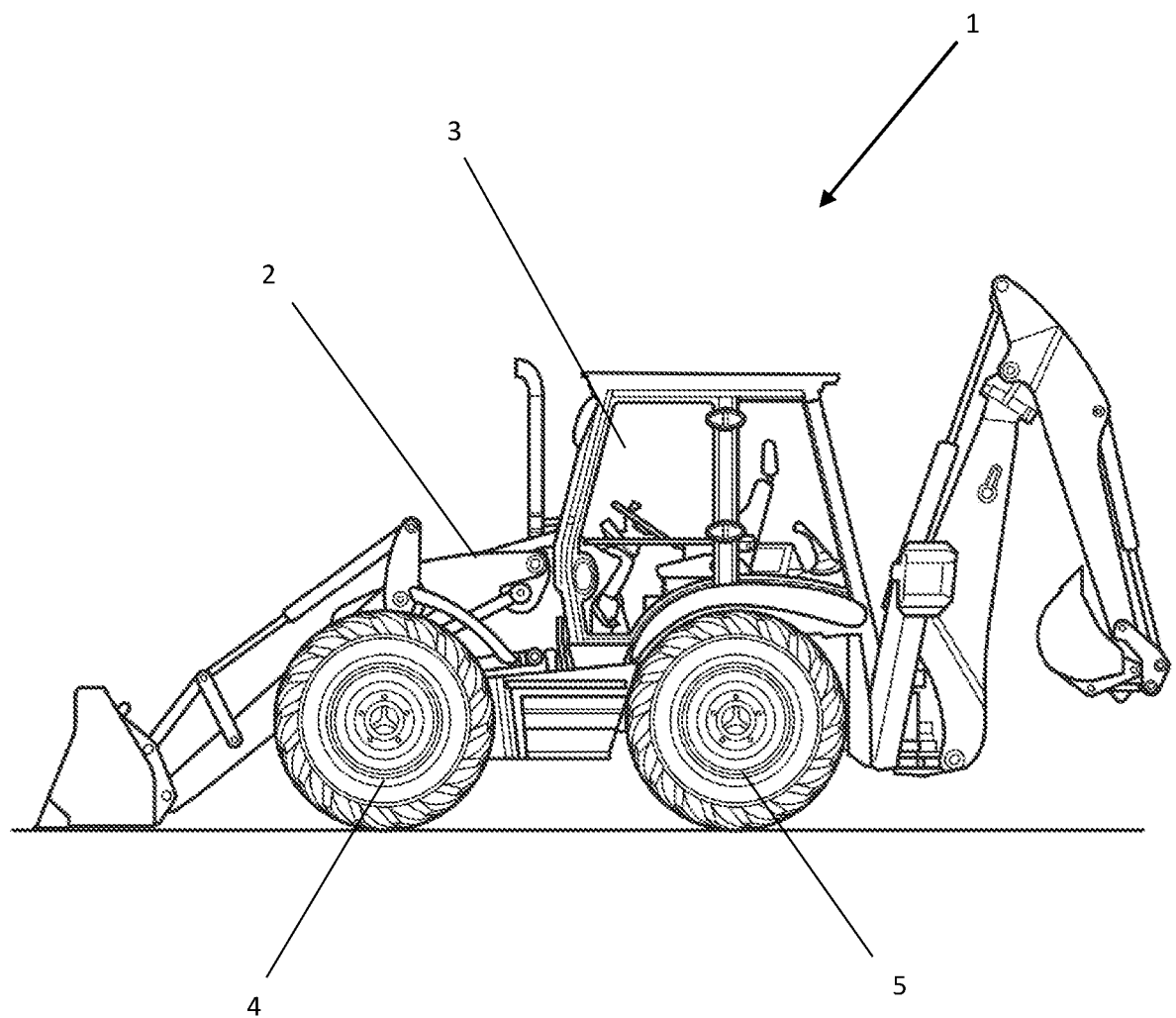
FIG. 1 is a side view of a working machine in accordance with the present disclosure.

With reference to FIG. 1, an embodiment of this disclosure includes a machine 1 which may be a working machine. In this embodiment, the working machine is a backhoe loader. In other embodiments, the working machine may be a telescopic handler, a skid steer loader, a wheel loader, or a telescopic wheel loader, for example. Such machines may be denoted as off-highway working machines. The machine 1 includes a machine body 2 which may include, for example, an operator cab 3 from which an operator can operate the machine 1.

In an embodiment, the machine 1 has a ground engaging propulsion structure comprising a first axle assembly and a second axle assembly, each axle assembly being coupled to a pair of wheels (two wheels 4, 5 are shown in FIG. 1 with one wheel 4 connected to the first axle assembly and one wheel 5 connected to the second axle assembly). The first axle assembly may be a front axle assembly and the second axle assembly may be a rear axle assembly.

Figure 2:
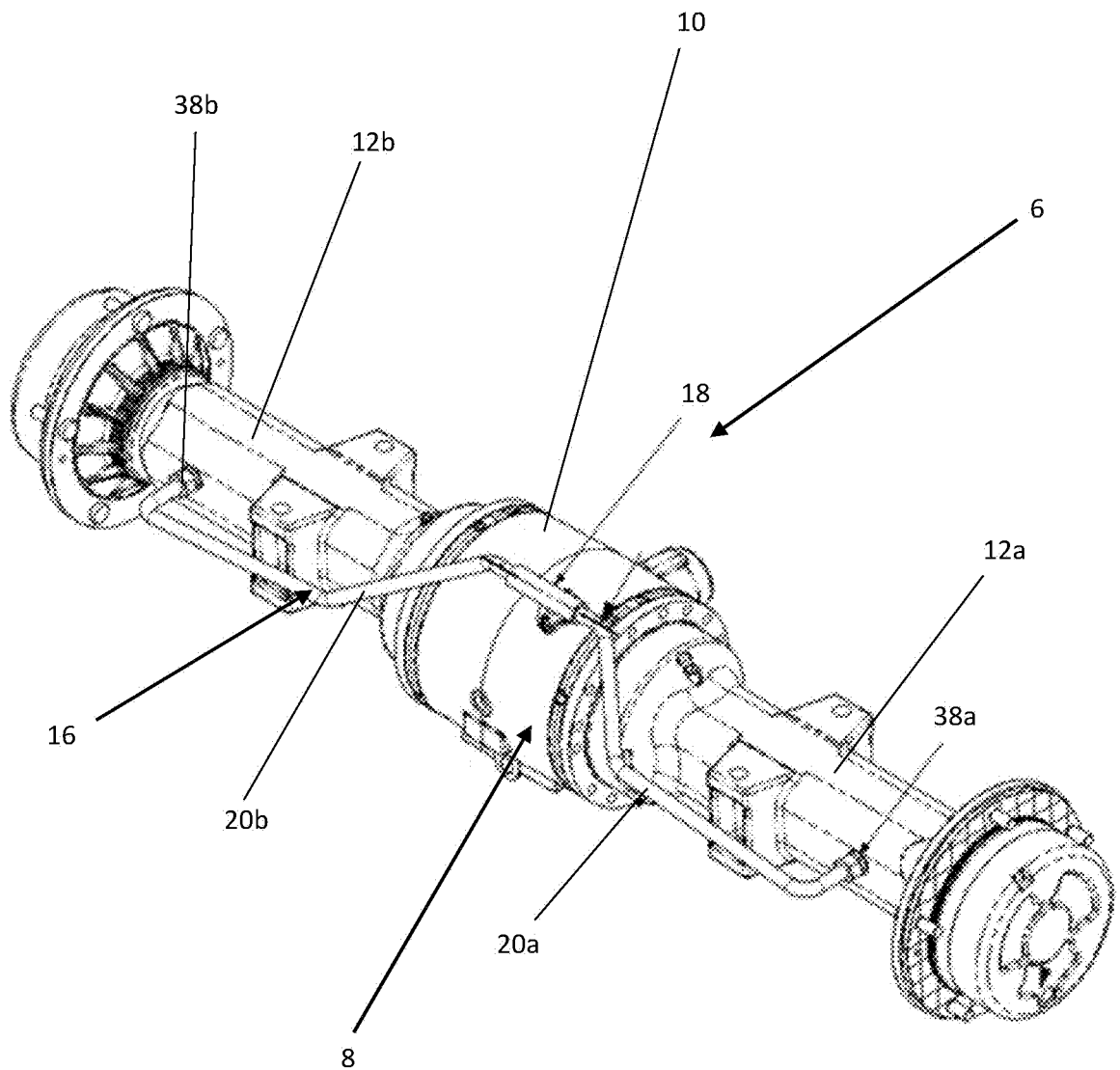
FIG. 2 is a perspective view of an axle assembly in accordance with the present disclosure.

Either or both of the first and second axle assemblies may be an axle assembly of the type illustrated in FIG. 2.

Figure 5:
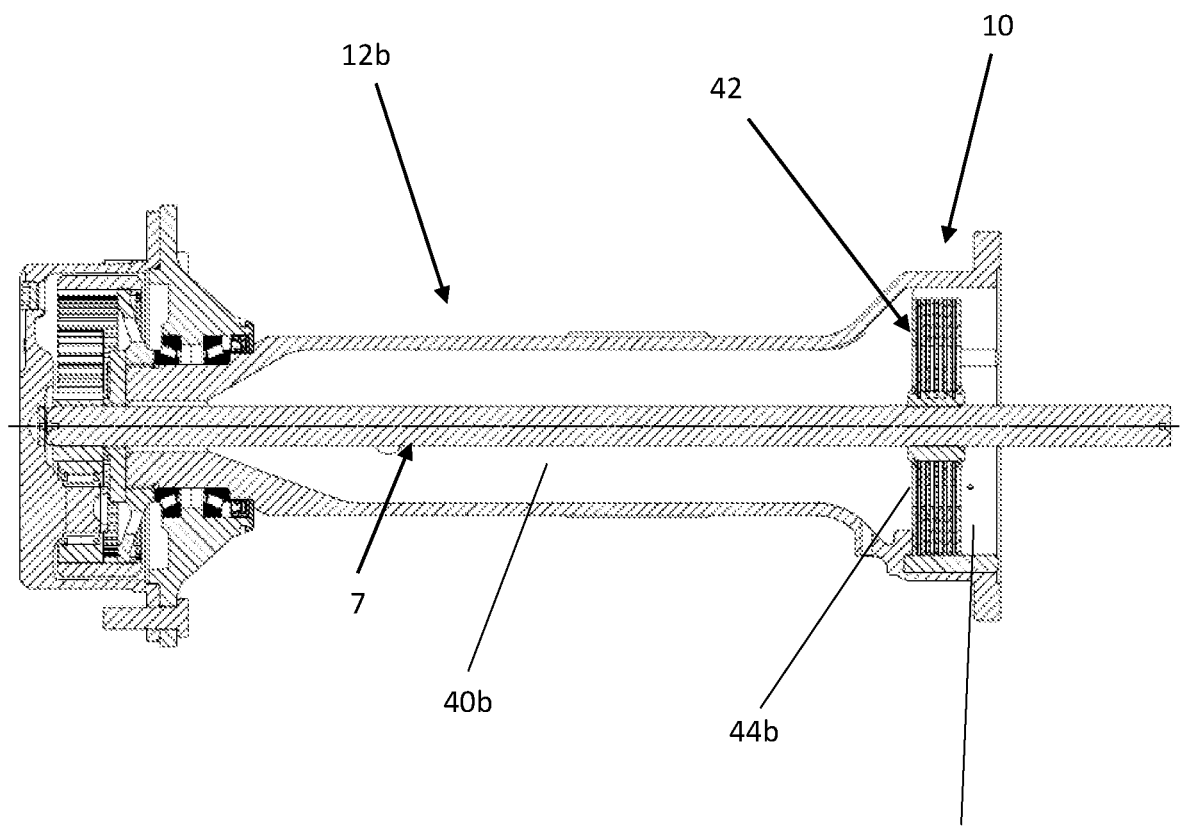
FIG. 5 is a cross-sectional view of an arm portion of the axle assembly of FIG. 2.

FIG. 2 shows an axle assembly 6 having an axle housing 8 including a central portion, a first arm portion 12a and a second arm portion 12b. Each of the first and second arm portions 12a,b extend from the central portion 10 and house an driveshaft 7 (as shown in FIG. 5).

Figure 4:
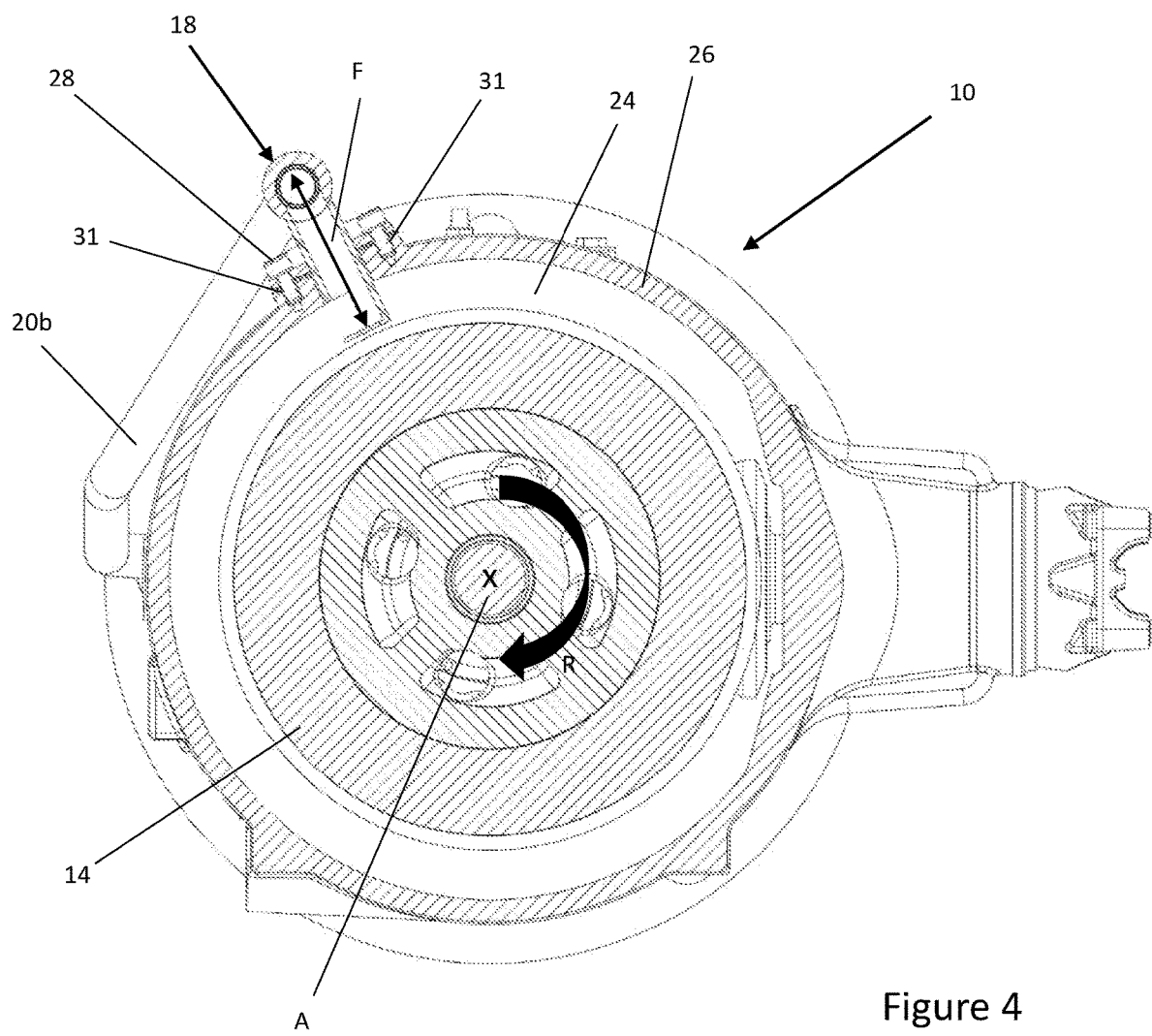
FIG. 4 is a perspective cross-sectional view of the catcher of FIG. 3 in position in a central portion of the axle assembly of FIG. 2.

With reference to FIG. 4, the central portion houses a gear 14 e.g. a crown gear. The gear 14 is configured to rotate about an axis A in a direction indicated by arrow R. The central portion may house a differential gearing system (not shown).

The central portion 10, first arm portion 12a and second arm portion 12b define a shared internal volume of the axle housing. This internal volume defines a shared lubricant reservoir within the axle housing 8 when the axle assembly 6 is in use. When in use, the crown gear 14 is partially disposed in the lubricant reservoir.

Referring to FIG. 2, the axle assembly 6 includes a conduit assembly 16 which is configured to direct lubricant from the central portion 10 to the first and second arm portions 12a,b. The conduit assembly includes a lubricant catcher 18 and first and second conduits 20a, b, wherein the lubricant catcher 18 is coupled to the first and second conduits 20a,b. The first conduit 20a is configured to direct lubricant from the lubricant catcher 18 to a distal end of the first arm portion 12a. Similarly, the second conduit 20b is configured to direct lubricant from the catcher 18 to a distal end of the second arm portion 12b.

Figure 3:
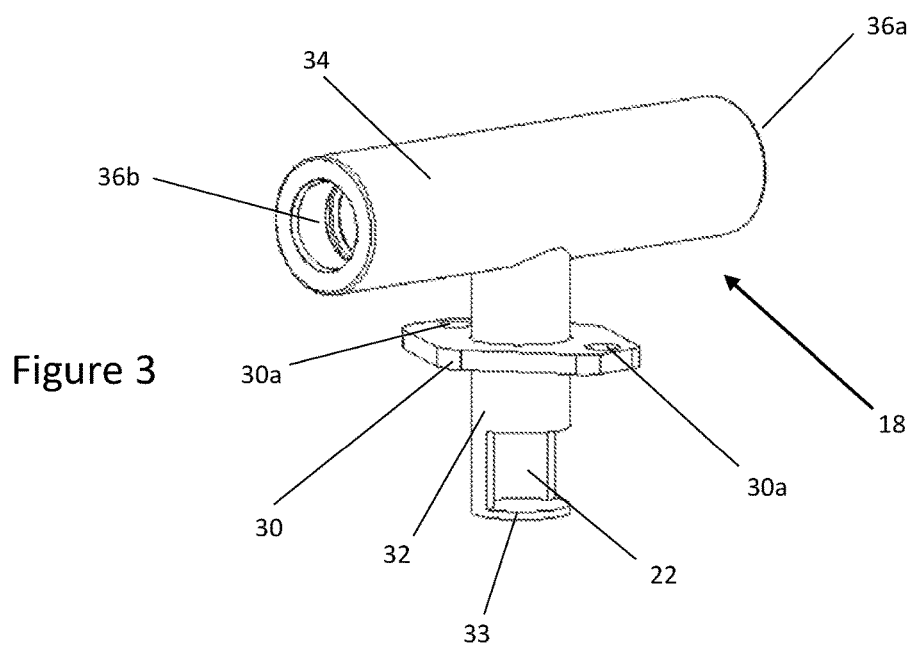
FIG. 3 is a perspective view of a lubricant catcher of the axle assembly of FIG. 2.

With reference to FIG. 3, the lubricant catcher 18 has an inlet 22 through which lubricant can enter the conduit assembly 16. As shown in FIG. 4, the inlet 22 of the lubricant catcher 18 is positioned in an interior volume 24 of the central portion 10.

Again with reference to FIG. 4, the conduit assembly 16 defines a flow path F which extends from the inlet 22 of the lubricant catcher 18 in a direction transverse to the axis of rotation A. The flow path F extends through a wall 26 of the central portion housing 10 to an exterior of the axle housing 8.

It will be appreciated that, as the crown gear 14 rotates, lubricant from the lubricant reservoir will be propelled by the crown gear 14 within interior volume 24 of the central portion 10. The inlet 22 of the lubricant catcher 18 is positioned in alignment with a trajectory of movement of the lubricant as it is propelled by the crown gear 14, such that lubricant can enter the inlet 22.

From the view shown in FIG. 4, movement of the crown gear 14 is in a clockwise direction. Consequently, lubricant will also be propelled in a substantially clockwise direction. The inlet 22 of the lubricant catcher 18 is located such that the inlet is open in a direction opposite to the direction of movement of the lubricant, i.e. facing a direction of rotation of the crown gear 14.

With reference to FIG. 3, the lubricant catcher 18 is substantially T-shaped and is designed as a single component made up of a first pipe portion 32, forming the stem of the T-shape, i.e. the vertical portion of the T-shape, and a second pipe portion 34, forming the top portion of the T-shape, i.e. the horizontal portion.

The first pipe portion 32 includes the inlet 22 at a first end and is coupled to the second pipe portion 34 at a second end.

The second pipe portion is coupled to the first conduit 20a at a first end 36a and is coupled to the second conduit 20b at a second end 36b. Each of the first and second pipe portions 32, 34 has a bore diameter of at least 10 mm. In the illustrated embodiment, the bore diameter of the first and second pipe portions 32, 34 is 14 mm.

As can be seen in FIG. 4, the flow path F extends from the inlet 22, along the length of the first pipe portion 32 to an inner wall of the second pipe portion 34.

The first pipe portion 32 of the lubricant catcher 18 includes a fixing plate 30 for securing the catcher 18 to the central portion housing 10. The catcher 18 and/or central portion 10 are configured such that the catcher 18 can only be fitted to the central portion 10 in a single orientation. In the illustrated embodiment, this is achieved by providing bolt holes 30a in the fixing plate 30 of the catcher 18 and corresponding bolt holes 31 in the wall 26 of the central portion 10. For example, the bolt holes 30a of the fixing plate 30 and corresponding bolt holes 31 of the central portion 10 are arranged to only line up for receipt of a bolt 28 in a single direction. This ensures that the catcher 18 can only be attached in a single orientation to ensure maximum flow of lubricant into the inlet 22. It will be appreciated that any other suitable means for restricting the orientation of the catcher may be applied.

The inlet 22 of the catcher 18 is formed as a cut out portion in a wall of the first pipe portion 32. The cut out portion forming the inlet 22 extends approximately halfway around the circumference of the first pipe portion 32. The end of the first pipe portion 32 in which the inlet is provided is closed by an end plate 33 e.g. a circular end plate.

In the illustrated embodiment, the first and second pipe portions 32,34 have a circular cross section. In other embodiments, the first and/or second pipe portions may have any other suitable cross section. In this case, the inlet may extend approximately halfway around the perimeter of the first pipe portion. In other embodiments, the inlet may be smaller or larger than this. The longitudinal height of the inlet, i.e. in a radial direction when fitted to the central portion 10, is maximized as much as possible given the dimensions of the crown gear 14 and the central portion 10.

As illustrated in FIG. 4, the lubricant catcher 18 is located at a rear side of the central portion 10 with respect to an intended direction of motion of the working machine 1.

In the illustrated embodiments, the first and second conduits 20a, b, have a bore diameter of at least 10 mm. In the illustrated embodiments, the bore diameter of the first and second conduits 20a,b is 14 mm.

In the illustrated embodiment, as shown at FIG. 2, for example, the first and second conduits have a circular cross section. In alternative embodiments, any other suitable cross section may be used.

As shown in FIG. 4, the lubricant catcher 18 extends through a wall 26 of the central portion 10 of the axle housing 8 such that the second pipe portion 34 is positioned external to the axle housing 8. The first and second conduits 20a,b are provided external to the axle housing 8 and configured to extend from the catcher 18 to a distal end of the respective arm portion 12a,b.

The first conduit 20a extends from the catcher 18 to the first arm portion 12a. The first conduit 20a is connected to the first arm portion 12a via a hydraulic fitting 38a such that the interior of the first conduit 20a is in fluid communication with the interior of the first arm portion 12a. Similarly, the second conduit 20b extends from the catcher 18 to the second arm portion 12b. The second conduit 20b is connected to the second arm portion 12b by a second hydraulic fitting 38b, such that the interior of the second conduit 20b is in fluid communication with the interior of the second arm portion 12b.

In the illustrated embodiment, the lubricant catcher 18 and the first and second conduits 20a,b are provided as separate components which are coupled together. In alternative embodiments, the catcher and conduits may be integrally formed.

The first and second conduits 20a,b and the lubricant catcher 18 have substantially the same bore diameter.

In the illustrated embodiment, the first and second conduits 20a,b are made of steel. In other embodiments, any suitable conductive material may be used. In further embodiments, any suitable material may be used.

In the illustrated embodiment, the catcher 18 is made of steel. In alternative embodiments, any suitable conductive material may be used. In other embodiments, any suitable material may be used.

With reference to FIG. 5, a cross sectional view of the second arm portion 12b is provided. The first arm portion 12a has the same structure as the second arm portion 12b, so it will be appreciated that the description provided below in relation to the second arm portion 12b also applies to the first arm portion 12a.

The second arm portion 12b of the axle housing defines an interior volume 40b which is open to the interior volume 24 of the central portion 10. In other words, the interior volume 40b of the second arm portion 12b (and similarly, the interior volume of the first arm portion 12a) is in fluid communication with the interior volume 24 of the central portion 10.

In use, the interior volumes of the first and second arm portions 12a,b and the interior volume 24 of the central portion 10 define a shared lubricant reservoir where lubricant is free to flow from the interior volumes 40b of the arm portions 12a,b to the interior volume 24 of the central portion 10 under gravity.

With reference to the second arm portion 12b, lubricant that is directed to the distal end of the arm portions 12b by the second conduit 20b flows into the interior volume 40b of the second arm portion 12b, and returns to the interior volume 24 of the central portion 10 under gravity. No pump or other mechanism for moving the lubricant is required. The same applies to the first arm portion 12a.

Figure 6:
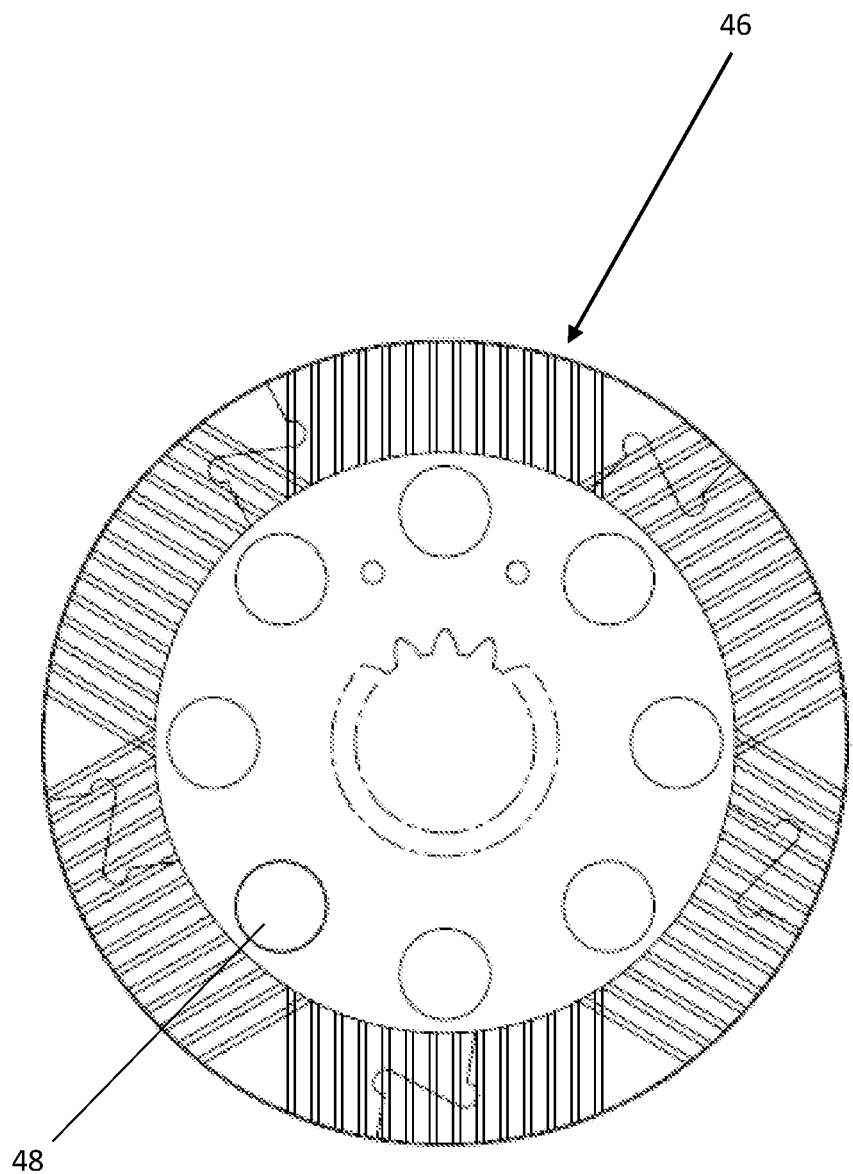
FIG. 6 is a front view of a brake plate that may be used with the axle assembly of FIG. 2.

As shown in FIG. 5, the axle assembly 6 further comprises a wet brake system 42 which is designed to run in a bath of lubricant. The wet brake system 42 is situated in the central portion 10 and has a first brake pack positioned on the side of the first arm portion 12a and a second brake pack 44b positioned on the side of the second arm portion 12b (as shown in FIG. 5). Each brake pack 44b includes a plurality of plates 46 (an example of which is shown in FIG. 6), each of which having a series of apertures 48 through which lubricant can flow to permit flow of lubricant through the brake pack 44b. In this way, lubricant is free to flow from the internal volume 40b of the second arm portion, to the internal volume 24 of the central portion 10. The same applies to lubricant in the first arm portion 12a.

An exemplary brake plate 46 is shown in FIG. 6. It will be appreciated that any suitable brake plate may be used. In some embodiments, the axle assembly does not include a brake system, or a brake system is provided external to the axle housing.

In the illustrated embodiment, a differential gear system (not shown) is provided between the brake packs within the central portion 10.

In use, as the crown gear 14 rotates, lubricant in the lubricant reservoir is propelled around the interior volume 24 of the central portion 10. The lubricant catcher 18 is positioned to intercept the trajectory of movement of the propelled lubricant such that lubricant enters the inlet 22 of the catcher 18 and travels along flow path F of the catcher 18.

Since the flow path F is arranged radially with respect to the crown gear 14, interruption to the trajectory of the flow of lubricant is minimized and therefore flow of lubricant out of the central portion is maximized. If, for example the flow path were to be arranged axially with respect to the crown gear 14, the lubricant propelled from the crown gear 14 would be required to sharply change direction, thereby reducing flow of lubricant out of the central portion.

From here, lubricant travels from the catcher along the first and second conduits 20a,b. In doing so, the lubricant is cooled to some extent, since the conduits 20a,b and the second pipe portion 34 are provided external to the axle housing 8 and so benefit from cooling due to improved air flow.

The conduits 20a,b direct lubricant to a distal end of the respective arm portion 12a,b and lubricant enters the respective interior volume 40b of the arm portion 12a,b. The arm portions 12a, b are typically cooler than the central portion 10 since they do not include heat generating components and are also better exposed to air flow. This has the effect of cooling the lubricant. In this way, the surface area of the axle housing 8 can be used more effectively to improve temperature uniformity across the axle assembly 6, leading to lower operating lubricant temperatures in the central portion 10, which improves lubricant life.

Once the lubricant has entered the respective arm portion 12a, b, it travels under gravity towards the interior volume 24 of the central portion, passing through the apertures of the brake plates of the brake system 42. In other words, the shared lubricant reservoir results in "self-levelling" of the lubricant, such that lubricant returns to the central portion 10. From here, the rotation of the crown gear 14 again propels lubricant in the lubricant reservoir, and the cycle continues.

In this way, effective cooling of the lubricant is achieved such that the temperature of the lubricant remains within acceptable limits.

Although the disclosure has been described in relation to one or more embodiments, it will be appreciated that various changes or modifications can be made, without departing from the scope defined in the appended claims. For example, it will be appreciated that an axle housing including a single arm portion may be used, the conduit assembly may comprise a single conduit, and/or any suitable gear may propel lubricant in the central portion.

In some embodiments, the axle assembly does not include internal wet brakes. In some embodiments, the axle assembly comprises a steering axle. In some embodiments, the axle assembly comprises external disc brakes at a distal end(s) of the axle assembly e.g. external to the axle housing.

The invention claimed is:

1. An axle assembly for a working machine, the axle assembly having an axle housing comprising:
    a central portion housing a gear, wherein the gear is configured to rotate about an axis and is configured to be partially disposed in a lubricant reservoir, and
    at least one arm portion extending from the central portion, the arm portion housing at least one driveshaft,
    the axle assembly further comprising a conduit assembly configured to direct lubricant from the central portion to the arm portion, the conduit assembly comprising a lubricant catcher having an inlet projecting radially into an interior volume of the central portion;
    wherein the lubricant catcher defines a radial flow path extending from the inlet of the lubricant catcher to an exterior of the axle housing;
    wherein, the gear is configured to move lubricant out of said lubricant reservoir, and wherein the inlet of the lubricant catcher is positioned in alignment with a trajectory of movement of said lubricant, such that the lubricant can enter the inlet, wherein the inlet is radially oriented in a direction opposite a direction of rotation of the gear.

2. The axle assembly according to claim 1, wherein the lubricant catcher is configured such that it can only be fitted in a single orientation with respect the central portion of the axle housing.

3. The axle assembly according to claim 1, wherein the lubricant catcher is located at a rear side of the central portion with respect to an intended direction of motion of the axle assembly when fitted to the working machine.

4. The axle assembly according to claim 1, wherein the conduit assembly comprises a bore diameter of between 5 mm and 14 mm.

5. The axle assembly according to claim 1, wherein the central portion and the or each arm portion define a shared lubricant reservoir, such that lubricant directed to the or each arm portion by the conduit assembly can return to the central portion under gravity.

6. The axle assembly according to claim 1, wherein the axle assembly further comprises a wet brake system comprising one or more plates, wherein each of the one or more plates comprises an aperture configured to permit flow of lubricant therethrough.

7. The axle assembly according to claim 1, wherein the conduit assembly is configured to direct the lubricant from the central portion to a distal end of the or each arm portion.

8. The axle assembly according to claim 1, wherein the conduit assembly comprises at least one conduit external to the axle housing, said conduit being configured to direct the lubricant from the central portion to the arm portion, or wherein the lubricant catcher extends through a wall of the central portion of the axle housing and is coupled to said conduit.

9. The axle assembly according to claim 8, wherein the lubricant catcher and conduit are integrally formed, or wherein the lubricant catcher and conduit are separate components.

10. The axle assembly according to claim 8, wherein the lubricant catcher and/or conduit has a bore diameter of between 10 mm and 14 mm, and wherein at least one of the lubricant catcher and conduit has a substantially constant bore diameter.

11. The axle assembly according to claim 8, wherein the arm portion is a first arm portion and the conduit is a first conduit, wherein the axle assembly further comprises a second arm portion and the conduit assembly comprises a second conduit, wherein the second conduit is configured to direct lubricant from the central portion to the second arm portion.

12. The axle assembly according to claim 8, wherein the or each conduit is made of a conductive material.

13. A working machine comprising the axle assembly according to claim 1.

* * * * *